May 15, 1956 L. W. MILOS 2,745,514
CONTINUOUS LUBRICANT SUPPLY FOR BEARINGS
Filed July 18, 1952
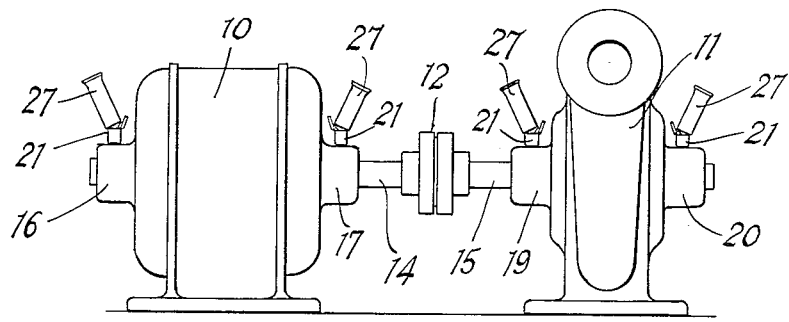
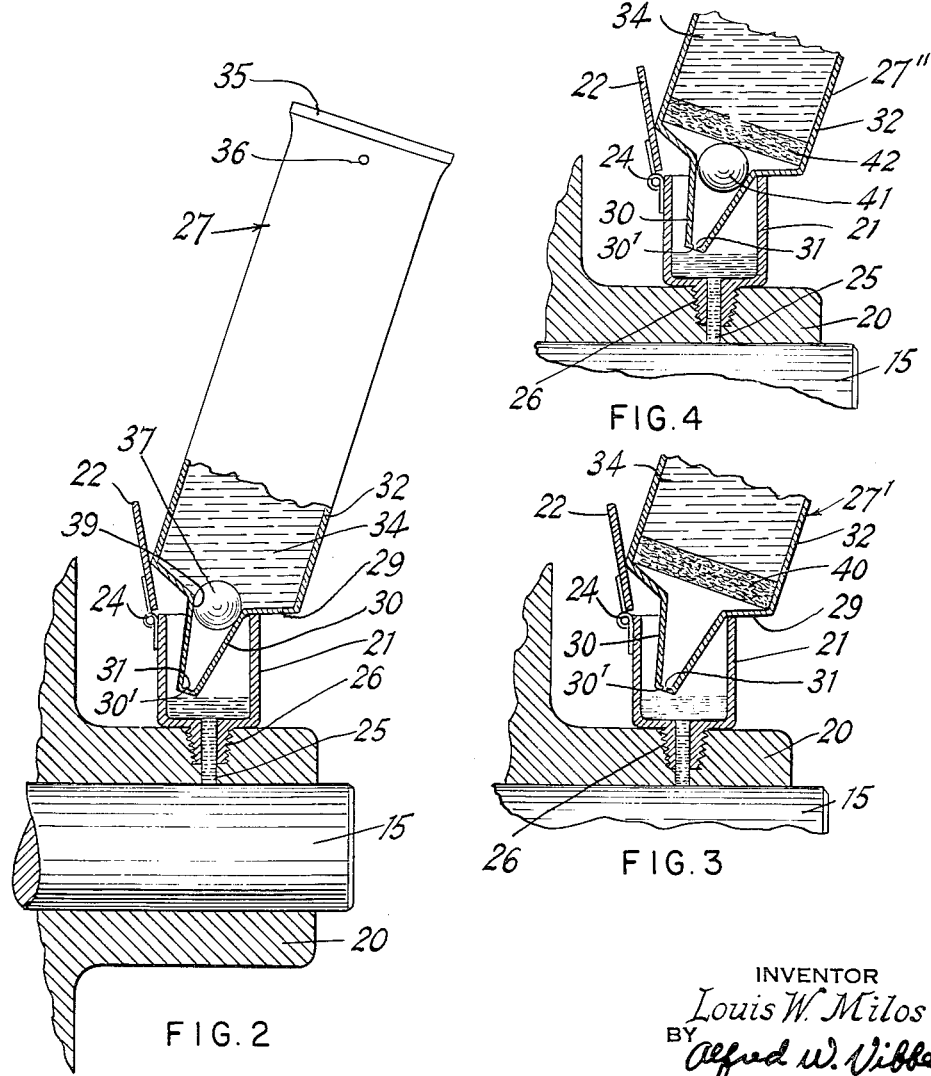
INVENTOR
Louis W. Milos
BY Alfred W. Vibber
ATTORNEY

United States Patent Office 2,745,514
Patented May 15, 1956

2,745,514

CONTINUOUS LUBRICANT SUPPLY FOR BEARINGS

Louis W. Milos, Clifton, N. J.

Application July 18, 1952, Serial No. 299,523

3 Claims. (Cl. 184—65)

This invention relates to a device for providing a continuous supply of lubricant to a bearing. More specifically, the invention provides a device for presenting a continuous supply of lubricating oil to a bearing, as through the oil cup for the bearing. The oil container per se of the device of the invention is designed to be installed as a semi-permanent part of the apparatus which includes the bearing to be lubricated.

The lubricant supply device of the invention is particularly designed for use with electric motors, electric motor-operated apparatus, for example, oil burners, and the like, although its use is not restricted thereto. Such devices, which are common in the home, are usually dirty and comparatively inaccessible, so that the average householder does not usually attend to their lubrication. Such servicing is usually done by a service man who visits the apparatus periodically. The average oil cup provided on the bearings of such apparatus, however, does not usually have a capacity to store a really adequate amount of oil for one year's service. Consequently service of such devices should really be carried out at more frequent intervals or the apparatus will suffer because of faulty lubrication.

The continuous lubricant supply for bearings of the present invention is designed to overcome such difficulties by providing a quantity of lubricating oil, which it feeds to the bearing at a predetermined slow rate, so that apparatus of the type described, provided with only the ordinary usual small oil cups, may safely be serviced at only infrequent intervals, such as once a year, with the assurance that the apparatus will not be damaged because of faulty lubrication of the bearings.

Specifically, the invention has among its objects the provision of a device for continuously supplying lubricant to a bearing which is economically and simply made, and which is easily installed at the bearing.

The invention has as a further object thereof the provision of a continuous lubricant supply for bearings, the supply means being of such character that the rate of feed of the oil therefrom into the bearing may be readily selected for various specific bearings.

Yet another object of the invention, in specific embodiments thereof, resides in the provision of an easily filled, non-breakable, container to be employed as an element of the continuous lubricant supply device of the invention.

The above and further objects of the invention will become more readily apparent upon the consideration of the following specification of which the drawings are a part.

In the drawings:

Fig. 1 is a view in side elevation of the combination of an electric motor and a pump, said motor and pump being equipped with continuous lubricant supply devices for the bearings thereof in accordance with the present invention;

Fig. 2 is an enlarged view, partially in vertical axial section and partially in elevation, of the right hand pump bearing of the pump shown in Fig. 1, Fig. 2 showing a first preferred embodiment of the continuous lubricant supply device of the invention intalled at such bearing;

Fig. 3 is a fragmentary view showing a part of the lubricating device at the oil delivery end thereof in the same manner as in Fig. 2, Fig. 3 showing a second preferred embodiment of the device; and Fig. 4 is a view similar to Fig. 3, Fig. 4 showing a third preferred embodiment of the lubricating device of the invention.

In Fig. 1 there is shown an electric motor 10 drivingly connected to a pump 11 through the medium of coupling 12. The motor shaft 14 and the pump shaft 15 are rotatably supported in bearings in the respective devices, the bearings of the motor being designated 16 and 17 and those of the pump 19 and 20. Each of said bearings is provided with an oil cup 21 disposed above it, said oil cup having a hinged cover 22 mounted on the spring hinge 24 so as constantly to be urged into a horizontal, closed, position.

As shown more clearly in Figs. 2, 3, and 4, wherein like parts are generally designated by the same reference characters, the bearing 20, shown therein, is provided with a vertically disposed oil conducting passage 25, the outer top end of which is provided with a threaded counterbore threadedly receiving the nipple 26 on the bottom of the oil cup 21. Oil flows downwardly under gravity from the space within the oil cup 21 through the passage 25 to the interface between the shaft 15 and the bearing providing bore through the means 20.

The continuous lubricant supply means shown in Fig. 2 is comprised of a collapsible tube generally designated 27, which when in use, is disposed in the oil cup 21 in the position shown. The tube 27, which is most conveniently formed by reverse extrusion from a slug of relatively soft metal, has a relatively thin flexible side wall 32 of cylindrical outer configuration, the lower part of such side wall being integrally connected to a first frusto-conical neck portion 29 of large apex angle, which in turn is integrally connected to a second, spout-forming, frusto-conical portion 30 of the neck of somewhat smaller apex angle. As initially extruded, the outer end or tip of the neck portion 30 is closed by a thin diaphragm-like transversely disposed disc of metal 30' integral therewith, which is designed to be pierced with a pointed instrument when the filled tube is to be installed at the point of its use. Means, to be described, is disposed within the lubricant containing tube 27 in the vicinity of the neck thereon at least partially to limit the rate of flow or drip of the oil when the tube is disposed as shown in Fig. 2. The oil 34 in such tube may conveniently be placed therein through the initially open large end of the tube, such end of the tube then being crimped to form a seal at 35.

As initially extruded, the inner and outer dimensions of the neck and the side wall portions of the tube 27 are held to close tolerances. Accordingly, the inner end of the second neck portion 30, in the vicinity of its junction with the first neck portion 29, presents an annular seat of quite accurate dimensions. In the embodiment shown in Fig. 2 such seat forming portion of the neck, together with a gravity held ball 37 seated therein constitute the means internal of the tube for at least partially limiting or metering the flow or drip of the lubricating oil from the tube 27 into oil cup 21.

The tube 27, filled with oil as shown, with an imperforate lower end on the neck portion 30 and with the crimp 35 at the upper end thereof, will be carried by the service man onto the job where equipment including bearings with passages leading thereinto is to be lubricated. The oil 34 will be of such predetermined character, including viscosity, as to be proper for the bearings to be serviced. The service man will then form the opening 31 through the diaphragm 30' at the lower end of the neck portion 30 by the use of an accurately graduated tapered pointed pin-like tool, so that he may form the opening 31 of the proper diameter, taking into consideration the viscosity of the oil in the tube, the average temperature of tube 27 at its place of installation throughout the year, the area of the passage through the internal flow or drip limiting means, and the length of time which is to elapse before the next servicing of the equipment. When opening 31 is below a predetermined diameter, with an oil of a given viscosity, it supplements the internally contained means in tube 27, such as the ball and seat, in determining the ultimate rate of flow or drip of the oil from the tube. The tube 27 is then installed in the oil cup 21 in the position shown, friction between the outer upper surface of the oil cup opposite the hinge 27 and the pried-open cap 22 stably supporting the tube in the position shown. An air-admitting hole 36 may then be punched through the upper part of the tube above the level of the lubricating oil therein and near the crimp 35.

With the proper correlation of oil viscosity, chosen with reference to the particular bearing to be serviced, the area of passage through the internal flow limiting means, the temperature at which the equipment operates, and of the diameter of the opening 31 through the diaphragm 30' at the bottom end of the neck, a predetermined quantity of oil in the tube 27 will slowly feed downwardly therefrom into the oil cup and thence to the bearing in a given time. It is readily feasible to make the tubes 27 of such size in installations such as, for example, oil burners, that the oil fed from the tube 27 into the oil cup 21 will be adequate to lubricate the bearings satisfactorily for a year.

In some instances it may be desired to use other types of rate of internal flow or drip limiting means than the one shown in Fig. 2. Thus in Fig. 3 there is shown in the lubricating oil supply tube 27' a disc of felt or other matted filter-forming material 40, which accurately fits within the container immediately above the portion 29 of the neck thereof. Such filter means 40 is so chosen, with reference to the viscosity of the oil 34, the temperature at which the equipment operates, and the length of time between service calls, as to deliver lubricating oil to the oil cup 21 at the desired rate.

A still further rate of internal flow or drip limiting means for the lubricating oil supply tube is shown in Fig. 4, wherein the tube is designated 27''. In such embodiment, which is particularly useful where it is desired that the rate of delivery of oil shall be low, there is employed both a ball 41 positioned in the seat forming portion of the neck and a permeable, filter-forming, disc 42, made of felt for example.

In both the embodiments of Figs. 2 and 4 it is usually desired to use as the, in effect, metering valve elements 37 and 41, respectively, steel balls or shot which have a slight, known, out-of-roundness, as for example, rejected ball bearings which are .0010 of an inch out-of-round. Such out-of-round shot or balls thus have eccentricities within closely measured ranges, so that the area of the passageway which they, in conjunction with the seat in the neck of the container, present to the passage of oil will be known and thus may readily be correlated with the factors above pointed out, such as the temperature of the equipment, the size of the opening to be made through the tip of the spout of the tube, the viscosity of the oil, and so on.

Whereas for purposes of illustration I have shown and described preferred embodiments of the continuous lubricant supply device for bearing and the like of my invention, it will be understood that such embodiments are illustrative only and that the invention is capable of considerable variation as to details. The invention is, therefore, defined by the scope of the claims appended hereto.

I claim as new the following:

1. A lubricating oil holding container adapted to be removably mounted in generally vertical position on the oil cup of a bearing, said container having a spout on its lower end, the spout having an upwardly flaring passage therein, the upper inner end of said passage constituting a seat, a gravity held eccentric ball disposed in said seat, the ball and seat presenting a minute opening therebetween when the ball is in the seat.

2. A lubricating oil holding container adapted to be removably mounted in generally vertical portion on the oil cup of a bearing, said container being in the form of a collapsible tube having a tapered spout on its lower end, the spout having an upwardly flaring passage therein, the upper inner end of the passage constituting a seat, a gravity held eccentric ball disposed in said seat, the ball and seat presenting a minute opening therebetween when the valve member is in the seat.

3. A lubricating oil holding container adapted to be removably mounted in generally vertical position on the oil cup of a bearing, said container having a spout on its lower end, the spout having a passage therein, the upper inner end of the passage constituting a seat, a gravity held eccentric ball in said seat, the ball and seat providing a minute opening therebetween when the ball is in the seat, and a ball retaining means in the form of a permeable disc within the container immediately above the ball whereby to prevent marked travel of the ball out of the seat and thus escape of the ball from the seat.

References Cited in the file of this patent

UNITED STATES PATENTS

| | | |
|---|---|---|
| 82,878 | Reynolds | Oct. 6, 1868 |
| 307,892 | Wilkinson | Nov. 11, 1884 |
| 718,801 | Strauss | Jan. 20, 1903 |
| 744,927 | May | Nov. 24, 1903 |
| 1,631,072 | Snow | May 31, 1927 |
| 1,689,800 | Parker | Oct. 30, 1928 |
| 2,041,920 | Gits | May 26, 1936 |

FOREIGN PATENTS

| | | |
|---|---|---|
| 727,943 | France | Apr. 4, 1932 |